(12) United States Patent
Daum et al.

(10) Patent No.: US 6,506,808 B1
(45) Date of Patent: Jan. 14, 2003

(54) MICROCELLULAR THERMOSET FOAMS AND METHOD FOR PRODUCING THE SAME

(75) Inventors: Ulrich Daum, Hofstetten (CH); Dietmar Rakutt, Cham (CH)

(73) Assignee: Lonza AG (CH)

( * ) Notice: Subject to any disclaimer, the term of this patent is extended or adjusted under 35 U.S.C. 154(b) by 0 days.

(21) Appl. No.: 09/530,414

(22) PCT Filed: Oct. 27, 1998

(86) PCT No.: PCT/CH98/00457

§ 371 (c)(1),
(2), (4) Date: Jul. 10, 2000

(87) PCT Pub. No.: WO99/23142

PCT Pub. Date: May 14, 1999

(30) Foreign Application Priority Data

Oct. 31, 1997 (CH) ................................ 2517/97

(51) Int. Cl.$^7$ .................................. C08J 9/12
(52) U.S. Cl. ..................... 521/79; 264/50; 264/51; 264/53; 521/180; 521/181; 521/183; 521/184; 521/187
(58) Field of Search .................... 521/79, 178, 187, 521/180, 181, 183, 184; 264/50, 51, 53

(56) References Cited

U.S. PATENT DOCUMENTS

| | | | |
|---|---|---|---|
| 4,473,665 A | 9/1984 | Martini-Vvedensky et al. | |
| 4,761,256 A | 8/1988 | Hardenbrook et al. | |
| 5,066,684 A | 11/1991 | LeMay | |
| 5,116,883 A | 5/1992 | LaMay | |
| 5,158,986 A | 10/1992 | Cha et al. | |
| 5,160,674 A | 11/1992 | Colton et al. | |
| 5,334,356 A | 8/1994 | Baldwin et al. | |
| 5,670,102 A | * 9/1997 | Perman et al. ............... | 264/50 |
| 5,955,511 A | * 9/1999 | Handa et al. ................ | 521/97 |

FOREIGN PATENT DOCUMENTS

WO    WO 92/19533    10/1992

\* cited by examiner

*Primary Examiner*—Morton Foelak
(74) *Attorney, Agent, or Firm*—Fisher, Christen & Sabol

(57) ABSTRACT

Microcellular rigid foams with a matrix consisting of cross-linked duromers, especially of polytriazine resins, and with an apparent density of 20 to 95 percent of the density of the compact matrix material. The rigid foams are highly stable and highly temperature resistant and are suitable for use, e.g., as material for aircraft lining.

18 Claims, No Drawings

MICROCELLULAR THERMOSET FOAMS AND METHOD FOR PRODUCING THE SAME

This is a 371 of PCT/CH98/00457, filed on Oct. 27, 1998, which has benefit of Swiss Application No. 2517/97, filed on Oct. 31, 1997.

The present invention relates to microcellular foams made from thermosets, and also to a process for their production. It further relates to partially crosslinked thermosets which comprise blowing agents and are intermediates in the novel process.

The foams most widely used hitherto have relatively large cells of the order of size of from about 50 to 1000 μm and have polyurethanes or thermoplastics as matrix material. The large cells bring about a reduction in the quotient calculated from (e.g. tensile) strength and density to below the value of the corresponding compact material, i.e. as porosity increases strength reduces more rapidly than density. For many applications, however, the opposite effect would be desirable, since this would enable genuine savings of material to be made or greater forces to be withstood using the same amount of starting material. It is known that reducing the cell size to values of the order of size of 10 μm or below can in some cases dramatically increase the strength of foams (U.S. Pat. No. 4,473,665, U.S. Pat. No. 5,160,674). The term "microcellular foams" has become established for foams of this type. These known microcellular foams are based on thermoplastic matrix materials and the processes for producing them can only be used for materials of this type. However, significant disadvantages are associated with the use of thermoplastic matrix materials. Some of these are associated with the process and others relate to the properties of the resultant foams. A process-related disadvantage is the need for high pressures during moulding, due to the high viscosity of the polymer melts. This requires the use of extruders. However, the most significant disadvantage is that the thermoplastic foams have limited heat resistance. In contrast, thermosets can be processed at low pressures since with these the final polymerization or crosslinking does not take place until after moulding. In addition, their maximum working temperature is higher, reaching up to about 400° C. in the case of polytriazine resins, for example. Their three-dimensional crosslinking also gives them higher strengths than most thermoplastics, although they are more brittle than these in the compact state. There are also some known foams based on thermosets, but these have the large cells mentioned at the outset—with the resultant poor strength values—and are moreover mostly of open-cell type. The object of the present invention was therefore to provide microcellular foams made from thermosets which combine the known good properties of thermoset matrix materials with the advantageous effects of the microcellular state.

According to the invention, this object is achieved by the foams according to the microcellular rigid foam of the invention.

It has been found that a suitable production process can give microcellular rigid foams with a matrix made from crosslinked thermosets and with an apparent density of from 20 to 95% of the density of the compact matrix material. "Microcellular" here means an average cell diameter of less than 50 μm, preferably less than 25 μm. The novel foams are predominantly of closed-cell type.

The matrix material of the novel microcellular foams is preferably selected from the group consisting of polytriazine resins, epoxy resins, phenolic resins, polyimide resins and combinations or blends of two or more of these resins.

Particular preference is given to matrix materials made from polytriazine resins obtained by cyclotrimerizing one or more aromatic cyanates.

Very particular preference is given to matrix materials made from polytriazine resin obtained by cyclotrimerizing an aromatic cyanate prepared by cyanating a novolak. These aromatic cyanates are obtainable, for example, from Lonza AG as Primaset™ PT Resins.

The novel microcellular foams may be produced by impregnating the prepolymerized or precrosslinked thermosets, at elevated pressure and elevated temperature, with a physical blowing agent, then expanding the materials at a lower pressure and, if desired, higher temperature and finally fully curing the materials, where the temperature during the expansion procedure and curing procedure is always below the glass transition point of the material at that juncture. The prepolymerization or precrosslinking here may take place in an entirely separate process step or immediately prior to the impregnation with the blowing agent. The impregnated matrix material may be cooled under pressure and thus be converted into a storage-stable state with physically dissolved blowing agent, so that the expansion takes place in a step which is spatially and/or chronologically separate. Alternatively, the expansion may take place immediately after impregnation. An important factor for the success of the novel process is the correct degree of prepolymerization prior to impregnation. If the degree of polymerization is too small a conventional foam is obtained, and if prepolymerization is too extensive no foam at all is formed, and all that happens is that the material cracks and to a greater or lesser extent is blown apart. The correct conditions for the prepolymerization depend on the thermoset used and in some cases have to be determined by experiments. It is also important that during the expansion and the curing the temperature always remains below the glass transition point. The glass transition point is lowered by the dissolved blowing agent, which acts as "plasticizer", and rises during the expansion and the curing.

Examples of suitable blowing agents are low-molecular-weight hydrocarbons, in particular $C_{1-6}$ alkanes or $C_{3-6}$ cycloalkanes, low-molecular-weight halogenated hydrocarbons and carbon dioxide. An important factor is the presence of a degree of mutual solubility, and substances with no solvent properties, such as nitrogen or noble gases, are unsuitable.

The impregnation with the blowing agent is preferably carried out at a pressure and temperature in the region of the critical point of the blowing agent, or thereabove.

Carbon dioxide is particularly preferred as blowing agent. The examples below further clarify the invention which should not be regarded as limiting.

EXAMPLE 1

An aromatic cyanate based on a phenolformaldehyde condensation product (Lonza Primaset™ PT 60) was prepolymerized ("gelled") at 160° C. for 30 min. The resultant partially crosslinked material was impregnated at 46° C. and 96 bar with carbon dioxide for 16 h, whereupon its weight increased by 5.45%. The impregnated intermediate was then expanded at 180° C. for 75 s, giving a rigid foam with a density of 1.240 g/cm³.

EXAMPLE 2

The procedure was as in Example 1, except that the prepolymerization temperature was 170° C. The increase in weight during impregnation was 6.03% and the density of the foam was 1.173 g/cm³.

EXAMPLE 3

The procedure was as in Example 1, but the prepolymerization temperature was 180° C. The increase in weight during impregnation was 4.52% and the density of the foam was 1.233 g/cm$^3$.

EXAMPLE 4

An aromatic cyanate based on a phenolformaldehyde condensation product (Lonza Primaset™ PT 60) was prepolymerized ("gelled") at 180° C. for 120 min. The resultant partially crosslinked material was impregnated at 30° C. and 120–140 bar with carbon dioxide for 15 h, whereupon its weight increased by 7.95%. The impregnated intermediate was then expanded at 180° C. for 120 s, giving a rigid foam with a density of 1.189 g/cm$^3$.

What is claimed is:

1. A microcellular rigid foam that is predominantly closed-cell, that has a matrix made from a crosslinked thermoset and that has an apparent density of from 20 to 95 percent of the density of the compact matrix material.

2. The microcellular rigid foam according to claim 1, wherein the thermoset matrix material is a member selected from the group consisting of polytriazine resin, epoxy resin, phenolic resin, polyamide resin and a combination of two or more of these resins.

3. The microcellular rigid foam according to claim 2, wherein the thermoset matrix material is composed of a polytriazine resin obtained by cyclotrimerizing one or more aromatic cyanates.

4. The microcellular rigid foam according to claim 3, wherein the polytriazine resin was obtained by cyclotrimerizing an aromatic cyanate prepared by cyanating a novolak.

5. A process for producing a microcellular rigid foam according to claim 1, comprising impregnating, at elevated pressure and at a temperature between room temperature and the curing temperature, a partially-crosslinked, thermoset matrix material with a physical blowing agent, the physical blowing agent and the partially-crosslinked, thermoset matrix material having a degree of mutual solubility, expanding the partially-crosslinked, thermoset matrix material in a further step by lowering the pressure and/or increasing the temperature to form a microcellular structure having predominantly closed cells, and, finally, fully curing the expanded, partially-crosslinked, thermoset matrix material by heating to a temperature below the glass transition point.

6. The process according to claim 5, wherein the impregnation with the physical blowing agent takes place at a pressure and temperature in the region of the critical point of the physical blowing agent or thereabove.

7. The process according to claim 6, wherein carbon dioxide is used as the physical blowing agent.

8. The process according to claim 1, wherein the physical blowing agent is a low-molecular weight hydrocarbon, a low-molecular-weight halogenated hydrocarbon or carbon dioxide.

9. The process according to claim 5, wherein carbon dioxide is used as the physical blowing agent.

10. The process according to claim 5, wherein the partially-crosslinked, thermoset matrix material has been partially crosslinked to the degree that said partially-crosslinked, thermoset matrix material can be expanded to provide a microcellular rigid from having predominantly closed cells, and that does not crack during formation.

11. The process according to claim 5, wherein the partially-crosslinked, thermoset matrix material is impregnated with from 1 to 20 weight percent of physically dissolved physical blowing agent.

12. The process according to claim 9, wherein the partially-crosslinked, thermoset matrix material is composed of a polytriazine resin obtained by cyclotrimerizing one or more aromatic cyanates.

13. A partially-crosslinked thermoset which has from 1 to 20 percent by weight of physically dissolved physical blowing agent, the partially-crosslinked thermoset and the physical blowing agent have a degree of mutual solubility, and is an intermediate in the process according to claim 5.

14. The partially-crosslinked thermoset according to claim 13, wherein the physical blowing agent is carbon dioxide.

15. The partially-crosslinked thermoset according to claim 13, wherein the partially-crosslinked thermoset is a member selected from the group consisting of polytriazine resin, epoxy resin, phenolic resin, polyamide resin and a combination of two or more of these resins.

16. The partially-crosslinked thermoset according to claim 15, wherein the partially-crosslinked thermoset is a polytriazine resin obtained by cyclotrimerizing one or more aromatic cyanates.

17. The partially-crosslinked thermoset according to claim 16, wherein the polytriazine resin was obtained by cyclotrimerizing an aromatic cyanate prepared by cyanating a novolak.

18. The partially-crosslinked thermoset according to claim 14, wherein the physical blowing agent is a low-molecular weight hydrocarbon, a low-molecular-weight halogenated hydrocarbon or carbon dioxide.

* * * * *